United States Patent
Knappe et al.

(10) Patent No.: US 7,585,411 B2
(45) Date of Patent: Sep. 8, 2009

(54) LOW PRESSURE FILTRATION

(75) Inventors: Peter H. Knappe, Santa Barbara, CA (US); Michael J. Snodgrass, Santa Barbara, CA (US)

(73) Assignee: TriSep Corporation, Goleta, CA (US)

( * ) Notice: Subject to any disclaimer, the term of this patent is extended or adjusted under 35 U.S.C. 154(b) by 411 days.

(21) Appl. No.: 11/456,144

(22) Filed: Jul. 7, 2006

(65) Prior Publication Data

US 2007/0131614 A1   Jun. 14, 2007

Related U.S. Application Data

(63) Continuation-in-part of application No. PCT/US2005/000707, filed on Jan. 10, 2005.

(60) Provisional application No. 60/535,295, filed on Jan. 9, 2004.

(51) Int. Cl.
  B01D 63/12   (2006.01)
  B01D 61/18   (2006.01)
  B01D 61/00   (2006.01)

(52) U.S. Cl. ............... 210/321.69; 210/321.74; 210/321.83; 210/321.72; 210/232; 210/427

(58) Field of Classification Search ............... None
See application file for complete search history.

(56) References Cited

U.S. PATENT DOCUMENTS

| | | | |
|---|---|---|---|
| 3,456,802 A | 7/1969 | Cole | |
| 3,668,837 A | 6/1972 | Gross | |
| 3,912,624 A | 10/1975 | Jennings | |
| 4,125,463 A | 11/1978 | Chenoweth | |
| 4,767,539 A | 8/1988 | Ford | |
| 4,770,777 A | 9/1988 | Steadly et al. | |
| 4,834,881 A | 5/1989 | Sawada et al. | |
| 4,980,066 A | 12/1990 | Slegers | |
| 5,132,015 A | 7/1992 | Down | |

(Continued)

FOREIGN PATENT DOCUMENTS

EP   0584411 A1   3/1994

(Continued)

*Primary Examiner*—Krishnan S Menon
(74) *Attorney, Agent, or Firm*—Fitch, Even, Tabin & Flannery (57) ABSTRACT

High flow, low-pressure ultrafiltration or microfiltration spiral wound membrane cartridges are used in filtration of liquid feedstocks having high suspended solids. Applications may utilize either vacuum or pumping for transmembrane drive pressure (TMP), and gas may optionally be bubbled up through the cartridges with certain feedstocks. Water permeate flux rates as high as 90 gallons per square foot per day (gfd) can be obtained at TMPs below 5 pounds per square inch. By locating each spiral wound cartridge in its own casing and supplying liquid feedstock to an open lower end of the casing, as opposed to submerging such cartridges in a tank filled with feedstock, overall low pressure performance is greatly improved. High permeate flow can be maintained for long periods of time between shutdowns for intensive cleaning. TMP is gradually increased to maintain a substantially constant rate of permeate discharge until a target is reached, indicative of solids accumulation on the membrane surface to an undesirable extent; then backflushing is effected for a short time. Discarding the hold-up volume of feedstock in the cartridge, the backflushing fluid and dislodged solids, allows production to be promptly resumed with fresh feedstock at performance at near original levels.

11 Claims, 6 Drawing Sheets

U.S. PATENT DOCUMENTS

| | | |
|---|---|---|
| 5,236,643 A | 8/1993 | Tseng et al. |
| 5,352,362 A | 10/1994 | Mizutani et al. |
| 5,405,528 A * | 4/1995 | Selbie et al. ............... 210/232 |
| 5,494,577 A | 2/1996 | Rekers |
| 5,607,593 A * | 3/1997 | Cote et al. ............... 210/650 |
| 5,690,830 A | 11/1997 | Ohtani et al. |
| 5,916,441 A | 6/1999 | Raether |
| 6,582,605 B2 | 6/2003 | Krulik et al. |
| 6,755,970 B1 | 6/2004 | Knappe et al. |
| 2003/0127388 A1 | 7/2003 | Ando et al. |

FOREIGN PATENT DOCUMENTS

| | | |
|---|---|---|
| EP | 0669159 A1 | 8/1995 |
| EP | 0581544 B1 | 9/1997 |
| JP | 10230144 | 9/1998 |
| JP | 11104469 | 4/1999 |
| WO | 95352041 A1 | 11/1995 |
| WO | 0078436 A1 | 12/2000 |

\* cited by examiner

LOW PRESSURE FILTRATION

This application is a continuation-in-part of PCT/US2005/000707, filed Jan. 10, 2005, which claims priority from U.S. Provisional Application Ser. No. 60/535,295, filed Jan. 9, 2004, the disclosures of which are incorporated herein by reference.

This invention relates to the filtration of liquid feedstocks high in solids and more particularly to systems and methods for using membrane cartridges, particularly spiral wound membrane cartridges to economically achieve low fouling, high flow filtration with low energy input.

BACKGROUND OF THE INVENTION

Tertiary treatment of municipal sewage is a common wastewater application for ultrafiltration and microfiltration membranes; however, such systems need to be capable of operating on high suspended solids feed waters while having a long life with a minimum of chemical cleanings. Suspended solids that need to be removed may be materials that cause turbidity, such as bacteria, cysts and oocysts, viruses, colloidal material, such as iron oxides, clay, silt, sand and other insoluble impurities. Municipal sewage secondary treatment effluent typically has turbidity levels of 5 to 10 NTU with a suspended solids count of 10 to 20 parts per million (ppm). For membrane technology to be economically competitive in a tertiary treatment process, it should operate at sustained permeate flux rates of 15 to 30 gallons per square foot per day (gfd) with minimal energy consumption, while requiring chemical cleaning at a frequency of not more than once per month.

Perhaps the biggest dilemma facing ultrafiltration and microfiltration membrane technology is fouling, where suspended solids and natural organic matter are adsorbed onto the membrane surface and result in a decrease in permeate flux. Decreased permeate flux rates result in higher overall capital and operating costs due to the lower output over a given period of time. The development of new membrane technologies has focused on reducing or eliminating the adverse affects of membrane fouling. A membrane element or cartridge that can produce high flux rates while minimizing fouling can have an extreme economical advantage over competing technologies.

Historically, such difficult applications as treating feed solutions high in organic and suspended solids have employed spiral wound, hollow fiber, capillary, or tubular element designs in a multitude of configurations. The most common of configurations is a submerged membrane system where the membranes, whether it be spiral wound or hollow fiber, are placed vertically in an open tank and filled with a feed solution to be filtered.

Very generally, a spiral wound membrane cartridge contains a permeate carrier sheet, a membrane filter sheet that is adhesively bonded to the permeate carrier sheet (usually to both surfaces thereof to create an envelope about it), and a feed spacer sheet which separates two facing membrane filter layer sheets. Microfiltration (MF) and ultrafiltration (UF) membranes are typically formed of either polyethersulfone (PES), polysulfone (PSF), polyvinylidene fluoride (PVDF), or polyacrylonitrile (PAN) because these polymers are generally recognized in the industry to make membranes having high flux rates, good chemical resistance and good physical durability, which can be produced using conventional casting techniques. Other polymers such as polypropylene, polyethylene, and chlorinated polyethylene may also be used to construct UF and MF membranes. Spiral wound membrane cartridges exhibit good fouling resistance and offer economically attractive filtration with greater mechanical durability.

A traditional submerged membrane system is shown in FIG. 6 of WO 00/78436 patent application (28 Dec. 2000) wherein a spirally wound membrane element is immersed in a tank that is filled with a body of water to be filtered and air is bubbled up through the membrane for the purpose of maintaining a clean membrane surface. The required transmembrane pressure (TMP) is supplied by a pump that creates a vacuum in addition to any contribution from the static head. Alternatively, static liquid heads alone have been used to generate feed pressures for submerged filtration, see U.S. Pat. No. 5,916,441. These systems will typically also employ support frames and manifolds. Materials of construction are typically limited to 316 stainless steel for these type of systems, which is a significant capital expenditure. The use of 316 stainless steel also limits the amount of exposure to certain corrosive water sources, such as cleaning solutions and aggressive feedwaters such as seawater.

Factors which contribute to membrane fouling include water chemistry, suspended solids concentration (TSS), membrane chemistry and transmembrane pressure (TMP), are used to combat same. Membrane chemistries vary between polysulfone (PSF), polyethersulfone (PES), and polyvinylidene fluoride (PVDF); however, all are generally similar in their fouling tendencies. The more hydrophilic a membrane chemistry is, the more resistant it is to fouling, as fouling constituents are generally hydrophobic.

Membrane fouling typically occurs through two different mechanisms; pore impregnation and cake-layer formation. Pore impregnation occurs when organic and suspended solids penetrate and impregnate the pores of a membrane, thus narrowing the effective diameter of the pores and increasing the required net drive pressure for permeate production. Cake-layer formation involves large colloidal compounds and suspended solids accumulating on the membrane surface and forming a discrete layer of organic and suspended solids. Both fouling mechanisms result in decreased permeate flux.

Common methods to offset the effects of fouling for submerged membrane systems include air bubbling, backwashing, and chemical cleaning. Air bubbling, whether it be for a spiral wound or hollow fiber membrane, is quite effective at removing particulate matter from the membrane surface; however, it is an energy intensive process that often comprises 50% or more of the total energy costs associated with a submerged membrane system. The economical advantages of a membrane system that can eliminate or greatly reduce the use of air bubbling without increasing chemical cleaning frequency are obvious.

When the effects of fouling become irreversible, membrane cartridges require extensive cleaning with a variety of chemical cleaners. Existing submerged membrane systems often rely on extensive static soaking with an oxidant-based, caustic-based, and/or acid-based cleaner. Air bubbling is discouraged during cleaning and is often discontinued during the cleaning process so as to avoid excessive foaming and/or release of harmful vapors to the atmosphere. However, static cleaning has been found to be much less effective than dynamic cleaning wherein the added shear force enhances the removal of organic and suspended material from membrane surfaces.

Another problem associated with submerged membrane systems is the accumulation of solids in the process tank and the inefficient removal thereof. With submerged membrane systems, the suspended solids level inside the tank increases over time, due to accumulation, until a steady state value is reached. This steady state suspended solids level is directly proportional to the recovery of which the system operates at. For example, a system that operates at 90% recovery will have a steady state suspended solids value about ten times greater than that of the influent level. Since membrane fouling is directly proportional to suspended solids concentration, it is obvious that membrane fouling will be greater when the suspended solids level has reached its steady state concentration value; however, it is highly undesirable to lower the system percentage recovery for the sake of reducing fouling as such would drastically lower the overall efficiency of the system, potentially rendering it impractical and economically unattractive. Moreover, after every backwash, solids removed from the membrane surface are mixed directly back into the bulk tank solution, further complicating the solids build-up problem. Because large, submerged membrane systems utilize process tanks having very large holding volumes, it is impractical to drain said tanks on a frequent basis in order to purge the accumulated solids from the system.

With the foregoing in mind, work on improvements was undertaken.

SUMMARY OF THE INVENTION

This invention provides a system that employs a high-flow, low-energy, spiral wound MF or UF membrane cartridge that eliminates the need for a common membrane tank and is designed to greatly reduce energy consumption (i.e. air bubbling) and membrane fouling, and a method for its operation by removing all feedstock in contact with the membrane surfaces after every backwash. Although mechanical procedures, such as backwashing and air scouring, were earlier used to offset the effects of membrane fouling, it has now been found that by removing all the feed solution that is in contact with the active membrane surface after every backwash and then supplying the cartridge with fresh aqueous feedstock, there is a dramatic reduction in membrane fouling, such that the need for air bubbling may be eliminated. An arrangement is provided by which it becomes economically feasible, after every backwash, to drain all feedstock that was in contact with the active membrane surface, removing this feedstock plus all solids dislodged from said membrane surface during said backwash process and purge such directly from the system.

As mentioned, it is impractical to drain a large process tank used for existing submerged membrane systems after every backwash as the volume of water is too great, and such a procedure would very substantially reduce the overall system efficiency and increase system downtime. However, Applicants' reduction of the total volume of feedstock in association with membrane cartridges render it now practical to remove all such liquid after each backwash and supply the cartridges with fresh feedstock.

Applicants' present arrangement of an array of cartridges, in comparison to a comparable array of cartridges submerged inside a process tank filled with feedstock, drastically reduces the amount of feedstock in association with the cartridges by at least 50%, often by 60% or more and frequently by 70% or more, thus making it now economically practical to drain the system after every backwash. The present arrangement connects each cartridge to a support base, with a liquid tight seal between said cartridge and said base. Liquid feedstock is delivered, through the support base, directly to the open bottom end of the membrane cartridge, thus only a minimum volume of aqueous feedstock is needed to fill the feed channels between the active membrane surfaces and the base supply system. Consequently, drainage of the membrane cartridge along with the immediate feedstock supply manifold can be quickly accomplished in a practical and economical manner.

In one particular aspect, the invention provides a method for the filtration of a liquid feedstock high in suspended solids for the purpose of economically producing permeate lean in suspended solids, which method comprises: providing a spiral wound membrane filtration cartridge which includes membrane filter sheet material, feed spacer sheet material and permeate carrier sheet material spirally wound about a perforated permeate collection tube and confined within an open-ended tubular casing in a generally cylindrical, liquid-tight configuration, supporting said cartridge in a substantially vertical orientation, supplying a liquid feedstock to an open end of said cartridge, withdrawing liquid from said cartridge which permeates through said membrane sheet material and enters said permeate collection tube by establishing an initial transmembrane pressure (TMP) across said membrane of at least about 0.5 psi, increasing said TMP over time so as to maintain a permeate flow from said cartridge at about a constant rate, and periodically applying pressurized back-flush fluid to said permeate carrier fabric sheet to back-flush said cartridge by creating flow from within said permeate carrier sheet through said membrane sheet and into said feed spacer each time a predetermined target value is reached, and discarding the feedstock within said feed spacer material in said cartridge along with the back-flush fluid and dislodged solids after said periodic back-flushing and then resupplying said liquid feedstock.

In another particular aspect, the invention provides a system for the filtration of a liquid feedstock high in suspended solids for the purpose of economically producing permeate lean in suspended solids, which system comprises: a spiral wound membrane filtration cartridge which includes membrane filter sheet material, feed spacer sheet material and permeate carrier sheet material spirally wound about a perforated permeate collection tube and confined within an open-ended tubular casing in a generally cylindrical, liquid-tight configuration, a base for supporting said cartridge in a substantially vertical orientation, means for supplying a liquid feedstock to said base and to an open end of said cartridge, means for creating a liquid-tight seal between said base and said cartridge so that liquid feedstock being supplied flows through said feed spacer material, means for withdrawing liquid from said cartridge which permeates through said membrane sheet material and enters said permeate collection tube as a result of transmembrane pressure (TMP), means for applying pressurized back-flush fluid to said permeate carrier fabric sheet to back-flush said cartridge by creating flow from within said permeate carrier sheet through said membrane sheet and into said feed spacer material, means for periodically initiating such back-flush flow when permeate flow from said cartridge is indicative of an undesirable extent of solids accumulation on said membrane surface, and means for discarding the volume of liquid in said feed spacer sheet material including said back-flush fluid and solids dislodged by said back-flush fluid following completion of said back-flush flow and then resupplying said liquid feedstock to said cartridge.

In a further particular aspect, the invention provides a system for the filtration of a liquid feedstock high in suspended solids for the purpose of economically producing permeate lean in suspended solids, which system comprises: a spiral wound membrane filtration cartridge which includes membrane filter sheet material, feed spacer sheet material and permeate carrier sheet material spirally wound about a perforated permeate collection tube and confined within an open-ended tubular casing in a generally cylindrical, liquid-tight configuration, a base for supporting said cartridge in a substantially vertical orientation, means for supplying a liquid feedstock to said base and to an open end of said cartridge, means for creating a liquid-tight seal between said base and said cartridge so that liquid feedstock being supplied flows through said feed spacer material, means for withdrawing liquid from said cartridge which permeates through said membrane sheet material and enters said permeate collection tube as a result of transmembrane pressure (TMP), and means for applying pressurized back-flush fluid to said permeate carrier fabric sheet to back-flush said cartridge by creating flow from within said permeate carrier sheet through said membrane sheet and into said feed spacer material, whereby wastewater treatment can be effectively carried out without submergence of such cartridges in a tank.

DETAILED DESCRIPTION OF THE PREFERRED EMBODIMENTS

Methods and systems for filtration of liquid feedstocks, preferably liquid feedstocks that are high in suspended solids are provided which are effective to produce permeate that is lean in suspended solids at an elevated production rate for a sustained period of operation before shutdown for substantial cleaning is needed in order to continue permeate production at a desired high rate of flux. Moreover, the resultant overall energy consumption is extremely favorable.

The liquid feedstock for treatment by the methods or systems disclosed herein may be any of a wide variety of feedstocks such as would be commonly treated in comparable submerged membrane systems, ranging from groundwater or surface water supplies to be used for drinking water through all types of wastewater, both industrial and municipal; the systems may also treat feed that is to be supplied to a membrane bioreactor (MBR). For example, feedstock from a municipal wastewater treatment facility will generally be supplied from a secondary treatment stage, and such will be fairly high in suspended solids. When used as a membrane bioreactor, municipal sewage in the primary wastewater treatment stage might be treated, or effluent from a primary or secondary wastewater treatment stage might also be treated. Thus, it may be appropriate to supply feedstock that may or may not have undergone prior primary or secondary treatment where some substantial settling should have occurred; as a result, such feedstock may contain very high suspended solids, e.g. 10,000-15,000 ppm, as well as high organic loading. As a part of such an MBR, there may be an aerobic and/or anaerobic section and an anioxic section which would reduce nitrates to nitrogen gas.

Although it should thus be apparent that the methods and systems are suitable for treatment of a variety of different aqueous feedstocks, it is felt that they have a particular advantage in being able to efficiently treat feedstocks having relatively high suspended solids and/or relatively high turbidity, more particularly aqueous feedstocks having suspended solids in amounts of 1,000 ppm and above and/or a turbidity of about 10 NTU or above. An objective is not only to produce a permeate which is lean in suspended solids and/or low in turbidity, but to achieve such production at what is considered to be an elevated rate of flux with infrequent chemical cleanings and reduced energy consumption. Very generally, an aqueous feedstock having suspended solids at a level of about 10 to about 50 ppm would be considered to contain a relatively high amount of suspended solids; similarly, wastewater having an NTU of about 3 to about 20 would be considered to have a turbidity that is relatively high. On the other hand, wastewater having suspended solids not greater than about 5 ppm might be referred to as being lean in suspended solids, and wastewater having a turbidity not greater than about 3 NTU might be referred to as being low in turbidity. From this standpoint, the methods and systems are often desirably operated to provide a filtered liquid that is lean in suspended solids and that has a low turbidity, most preferably one that is less than 0.1 NTU. The ability to achieve high flux through lengthy sustained periods of overall operation between the times of shutdown for chemical cleaning that are inevitably required for all wastewater treatment facilities. Economically important is the ability to operate without the use of air bubbling, or with only minimal air bubbling, as such also adds to operating expense.

Figure 1:
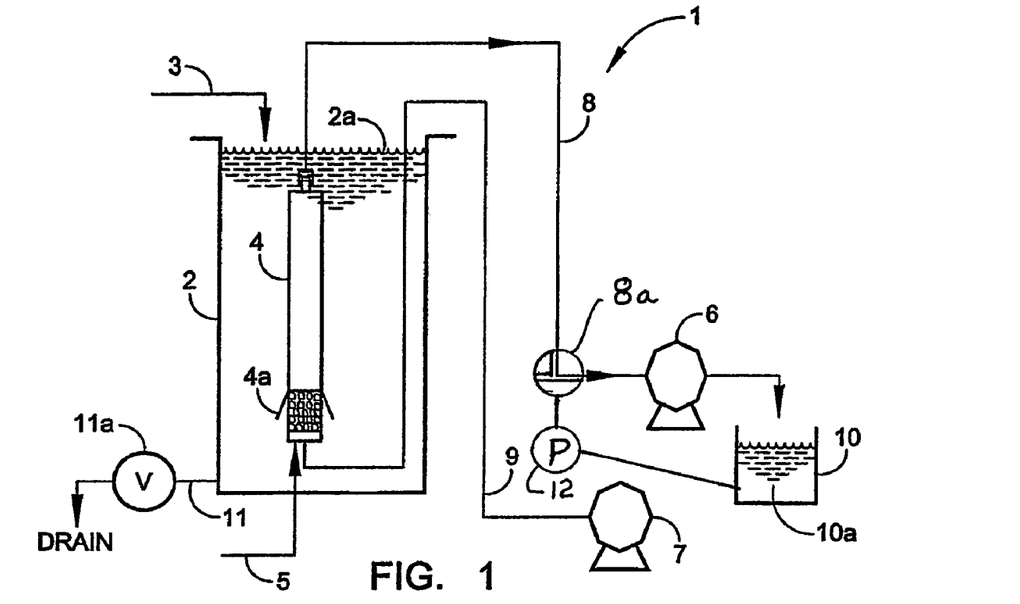
FIG. 1 is a schematic view which shows a completely submerged spiral wound membrane filtration system, using a vacuum pump to draw permeate from the membrane.
Figure 2:
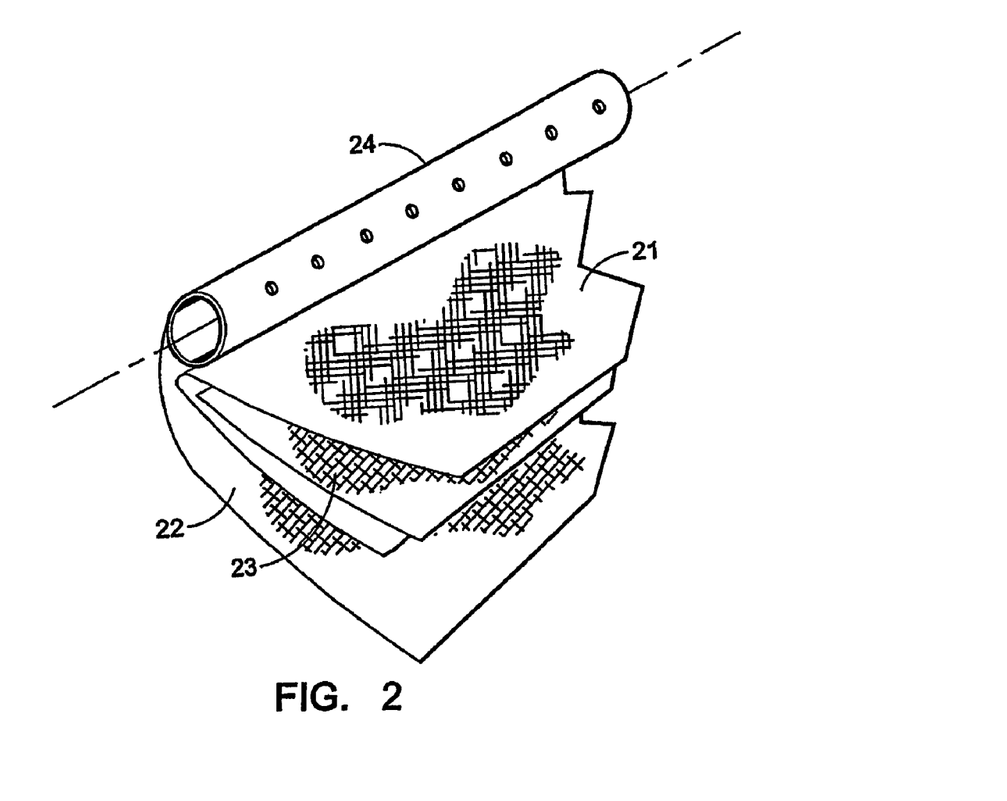
FIG. 2 is a schematic view which illustrates the basic design of a spiral wound membrane cartridge.

Shown in FIG. 2 is a diagrammatic representation of the formation of a spiral wound membrane cartridge which is typical of one that might be used in a submerged membrane filtration system such as that illustrated in FIG. 1. The spiral wound cartridge is formed using sheets or layers of three different materials: a membrane filter sheet 21, a permeate carrier sheet 22, and a feed spacer sheet 23. The membrane filter sheet 21 is normally folded in half over a feed spacer sheet 23 so that the active membrane surfaces or juxtaposes both surfaces of the sandwiched feed spacer sheet 23. The permeate carrier sheet 22 acts as a conduit to carry the permeating water to a perforated central permeate collection tube 24, about which tube the lay-up of three different sheet materials is spirally wrapped to create the spiral wound membrane cartridge.

In the spiral winding, an appropriate feed spacer 23 is important to facilitate effective treatment of feedstocks high in suspended solids by allowing easy removal of suspended solids during backwashing and subsequent cartridge draining. It is believed that the feed spacer should have a thickness of at least about 0.05 inch should not be thicker than about 0.2 in. Preferred feed spacers 23 have a thickness of at least about 0.08 inch (about 2.0 mm) and are made from a material that is hydrophobic and does not attract suspended solids. However, for applications where the feedstock will be particularly high in suspended solids, such as use of the cartridges in membrane bioreactors, it is believed that the feed spacer 23 should have a thickness of at least about than 0.120 inch, and generally its thickness will not exceed about 0.25 inch.

Various feed spacer designs and geometries may be employed, including corrugated, symmetrical, and asymmetrical. The feed spacers 23 should have a highly open design; the volume should be at least 80%, and preferably at least 90%, open space. Corrugated feed spacers, having the undulating shape of the center ply of 3-ply corrugated paperboard, may be used, which have the same thickness range as described above, and such will generally have between 2 and about 6 corrugations per inch so the axially extending passageways they provide are relatively broad. Symmetrical feed spacers are made from two sets of polymeric strands, wherein the strands of each set are aligned in a generally parallel relationship, with the strands of each set crossing at an angle of at least about 30° degrees to each other. Preferably, the sets of strands each have a strand count of between about 2 and 6 strands per inch, and they are arranged symmetrically, often with the strands perpendicular to one another. Very often the orientation of the feed spacer is such that the strands of each set are aligned at an angle of about 45° to the axis of the spiral wound cartridge to present a diamond pattern to the flow of the feed. Asymmetrical feed spacers consist of two such sets of polymeric strands, with one set of strands aligned parallel to the axis of the spiral wound cartridge while the other strand set is aligned at an angle of less than 90° (e.g. 45°) to the axis of the spiral wound cartridge.

Solids removal from feedstock in the membrane system can be accomplished in one of two modes. The cartridge can be run in a dead-end filtration mode for a certain period of time as the solids concentration in the cartridge increases until backwash is deemed necessary and effected using a volume, often of permeate, that is sufficient to revitalize the cartridge. The alternative arrangement is to operate the cartridge in a crossflow filtration arrangement by withdrawing a portion of the feedstock from the open upper end of the cartridge in a continuous or semi-continuous manner during the filtration cycle by feeding liquid feedstock into the bottom of the cartridge at a rate that is, e.g., about 5% to 10% greater than the rate at which water permeates through the total membrane surface. Withdrawal of the increased solids concentration liquid feedstock is often described in terms of its proportion to the overall supply of liquid. In the dead-end mode, it is desirable that the relative withdrawal of permeate and supply of feedstock is such that the liquid level in such a vertically oriented membrane cartridge remains at about a constant height to fill the spiral windings. Typically, in a crossflow operation, the withdrawal of feedstock is from a region at or near the top of the membrane cartridge, where it will include a relatively high amount of suspended solids. Generally, the supply of feedstock to an array of submerged cartridges and withdrawal to drain or otherwise in a crossflow mode will be continuous. Withdrawal is desirably not greater than about 10% of the rate at which the feedstock is being introduced into the tank.

Schematically illustrated in FIG. 1 is a traditional submerged membrane cartridge filtration system 1 utilizing a vacuum pump 6 to draw permeate from a spiral wound membrane element or cartridge 4. The system has a main tank 2 which contains a feed solution 2a that is supplied via inlet piping 3. The spiral wound cartridge 4, having a frustoconical skirt 4a surrounding its open lower end, is vertically mounted in tank 2, which contains liquid feedstock, that is high in solids, to a height greater than the upper end of the cartridge 4. Although only a single cartridge is shown, it should be understood that an array of such cartridges would be disposed in the tank as shown, e.g. in published International Patent Application WO 2005/118115, the disclosure of which is incorporated herein by reference. A central permeate collection tube 24 (FIG. 2) in the cartridge 4 is connected to piping 8 leading to the suction side of the pump 6 so that permeate water 10a is drawn from the permeate passageways, via vacuum created by pump 6 which provides the TMP, and discharged to a permeate collection tank 10. An air delivery device 5 is mounted vertically below the membrane cartridge 4 to bubble air, that is supplied through piping 9 from a blower or air compressor 7, up through the open bottom end of the membrane cartridge 4. Air is funneled into feed spacer passageways in the membrane cartridge 4 by the skirt 4a. Permeate removal may be periodically suspended by closing a valve 8a in the line 8 while continuing to provide air scouring, thereby promoting settling in other regions of the tank. This procedure may increase the effectiveness of the air scouring by reducing the convective flow carrying solids into the membrane surface. This "idling" may, for example, be done periodically, e.g. every 15-30 minutes for a duration of 10-60 seconds. A small portion of the feedstock 2a is withdrawn via a pipe 11 from a bottom region of the tank to a drain or other treatment process. This "concentrate" flow of feedstock is higher in suspended solids than the incoming feed, and outflow is controlled by a valve 11a to maintain a desired level of liquid feedstock in the tank 2. In addition to the air scouring, backwashing or backflushing may be employed to dislodge accumulated solids, and for this purpose a pump 12 is provided which takes suction from the permeate tank 10. When the valve 8a is shifted, the pump 12 causes water flow in reverse direction through the carrier sheets 22 and then out the pores of the membrane sheets 21. Overall, the outgoing concentrate discharge flow rate is typically about 5-10% of the feed flow rate through the inlet pipe 3, with permeate production thus equaling 90-95% of the inlet flow rate; exact balance depends on overall operating and process conditions.

Figure 3:
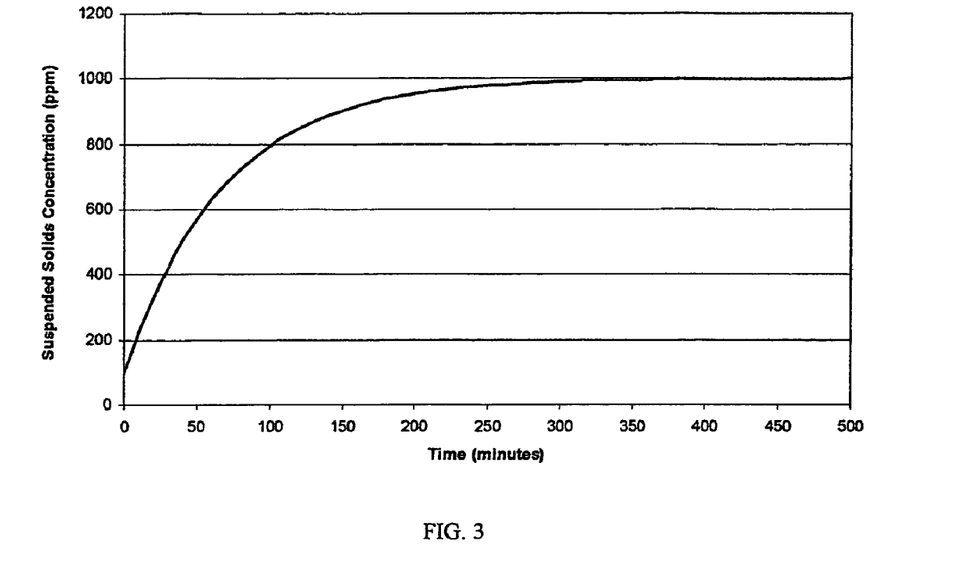
FIG. 3 is a graph showing the rate of increase and resulting steady-state concentration of suspended solids in the liquid feedstock inside the process tank of a traditional submerged membrane system.

Shown in FIG. 3 is a graphic representation of weight percentage of suspended solids in the liquid in the tank in which separation cartridges are submerged for a traditional submerged membrane system, showing its operation to reach steady state condition, where further operation should result in settling of solids. The initial solids level represents the influent feedstock solids level. It shows that, over time, solids accumulate inside the tank, which would usually contain a plurality of such membrane cartridges, until a steady state level is reached. This steady state level is determined by the permeate recovery rate as, even when periodic backflushing is used, the solids dislodged from the membrane surfaces are simply returned to the tank, and the drainage or removal from the tank of high solids liquid is only sufficient to maintain about the desired liquid level in the tank 2.

Figure 5:
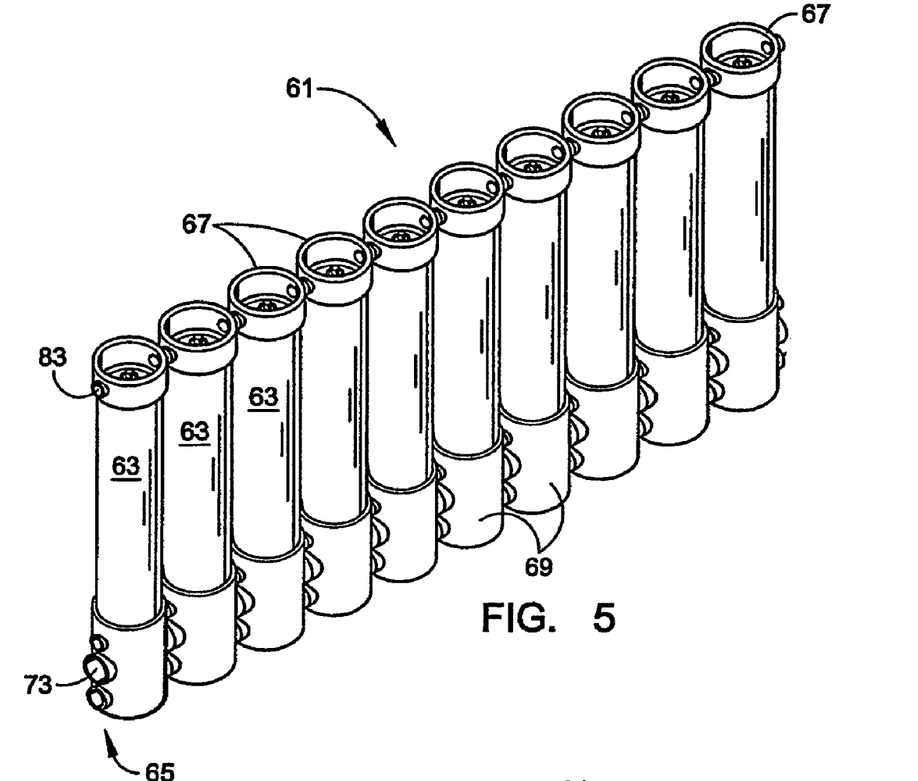
FIG. 5 is a perspective view showing an arrangement of a spiral wound membrane filtration system wherein membrane cartridges are individually fed.

Illustrated in FIGS. 5-11 is an alternative arrangement where, instead of employing a common tank or basin of a size to accommodate a plurality of spiral wound filtration cartridges, such cartridges are generally vertically disposed, with each cartridge maintained in a dry environment so the exterior portions thereof can be readily maintained if so required. In essence, each cartridge has an outer casing and acts as its own tank. FIG. 5 shows a system 61 wherein a plurality of such spiral wound membrane filtration cartridges 63 are aligned in a straight line, with each being supported by a manifolded base arrangement 65; this arrangement includes a plurality of individual bases or holders 69 (see FIG. 9), each of which receives the lower end of one membrane cartridge 63 at a liquid tight seal and supports it in substantially vertical orientation. The casing of each cartridge is surmounted by an overflow cap 67; the caps are interconnected with one another as are the individual bases 69 in the base arrangement 65.

Figures 7, 8:
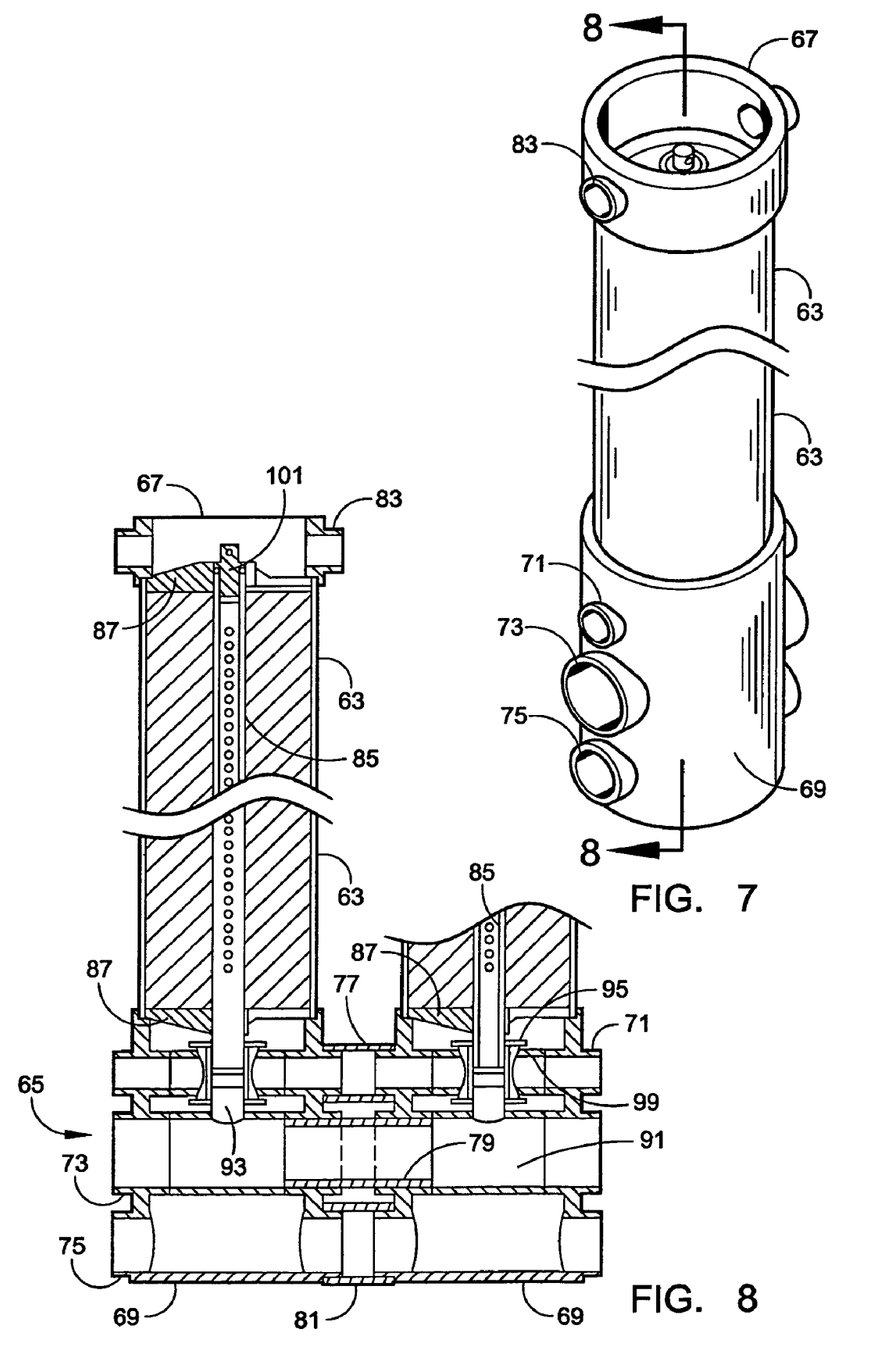
FIG. 7 is an enlarged perspective view showing one of the cartridge subassemblies from the system illustrated in FIG. 5.
FIG. 8 is a cross-sectional view taken generally along the line 8-8 of FIG. 7 showing a fragment of the adjacent cartridge subassembly.
Figure 9:
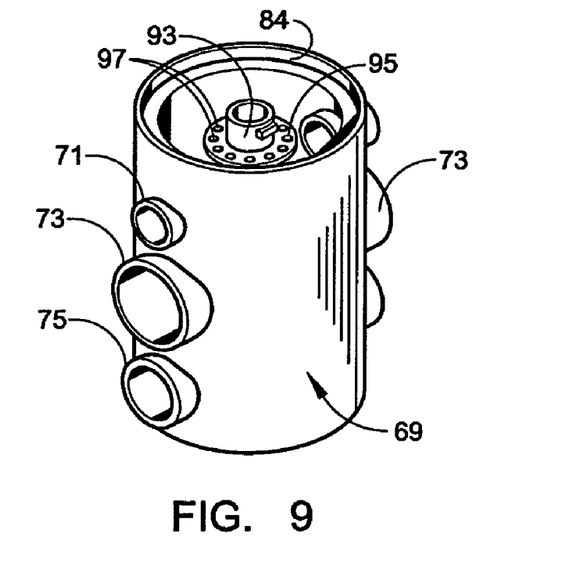
FIG. 9 is a perspective view showing the base from FIG. 7 with the cartridge removed.
Figure 11:
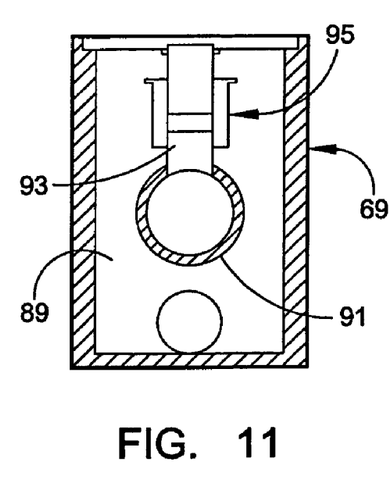
FIG. 11 is a cross-sectional view taken generally along the line 11-11 of FIG. 10.

The bases 69, as best seen in FIG. 9, are each formed with a series of three short tubes, arranged in vertical alignment, extending horizontally from the cylindrical base surfaces at diametrically opposed locations. In the illustrated embodiment, upper tubes 71 are used to form a part of a compressed air manifold so as to provide auxiliary air-scouring if desired. The central tubes 73 of the bases are coupled to one another to create a permeate header or manifold, and the lower tubes 75 are used to form a feedstock header or manifold that includes the interior region 89 of each base 69 outside of tubing for the other two manifolds as seen in FIG. 11. As shown in FIG. 8, the upper tubes 71 are coupled together by tubular couplings 77 that fit about their exterior and are suitably gasketed as by 0-rings. The central, permeate passageway tubes 73 are coupled together via short tubular couplings 79 that are disposed interior of the tubes and suitably gasketed or sealed. The lower feedstock tubes 75 are interconnected by external couplings 81 similar to the upper couplings 77. Alternatively, short couplings could be permanently heat-sealed or adhesively sealed to the facing short tubes of the adjacent bases 69.

Although the overall base arrangement could be created as an integral structure, from the standpoint of manufacturing efficiency, the employment of individual bases 69 should prove more economical. Whereas existing submerged membrane systems rely heavily on the use of stainless steel as a material of construction, the membrane cartridge support base 69 can be made entirely of injection-molded plastic. The use of injection-molded plastic not only decreases capital costs, but increases material resistance to corrosive liquids, such as acid, chlorine and caustic cleaning chemicals, as well as to corrosive feed waters, whereas such environments that typically cause problems for stainless steels. Because this new design is modular, it allows systems to be expanded by simply adding cartridges and bases. The injection-molded design is significantly less expensive than a comparable system employing stainless steel tanks and manifolds.

Figure 6:
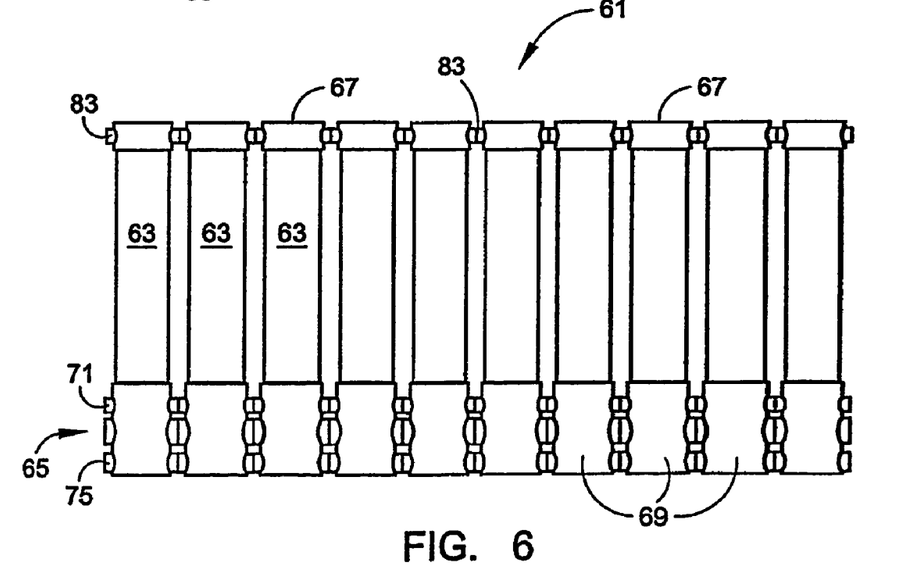
FIG. 6 is a front view showing interconnected cartridges as seen in FIG. 5.

As shown in FIGS. 7 and 8, the caps 67 are also provided with diametrically opposed stub tubes 83 which are joined or interconnected in a suitable manner, as seen in FIG. 6. For example, short split couplings may be used that would facilitate disassembly should, for whatever reason, it be necessary to remove one of the filtration cartridges 63 from the overall system 61.

More specifically, the filtration cartridge 63 is substantially vertically supported by the base 69 with its lower end being received in a receptacle 84 that is provided at the upper end of the base where the cartridge casing would be suitably sealed by O-rings or the like, or through the use of any other suitable fitting that would provide a liquid-tight arrangement. The surmounting cap 67 is similarly fitted and sealed to the upper end of the casing of filtration cartridge 63 and oriented so that all of the stub outlet tubes 83 are aligned in a straight line so they can be interconnected to form an overflow header; such could alternatively serve as a feedstock header were it desired for the feedstock to flow through the cartridge 63 in the opposite direction, which is considered to be an option but may be less desirable.

The general design of the membrane cartridge 63 is standard, as generally exemplified by FIG. 2; it has a plurality of leaves of feed spacer, porous membrane, and permeate carrier sheets spirally wrapped about a central permeate collection tube 85. The feed spacer sheet should be of a design that promotes solids staying in suspension during air-scouring so as to facilitate their being transported out of the cartridge as a result of backwashing and subsequent feedstock removal. The spacers may have symmetrical, asymmetrical, or corrugated geometry and yet achieve this objective. A standard anti-telescoping plate (ATP) 87 is affixed to the permeate tube 85 at each end. The cap 67 engages the ATP 87 at the top of the cartridge, and the outer rim of the ATP device 87 at the lower end of the cartridge is received in the receptacle 84 provided at the top of the base 69.

Figure 10:
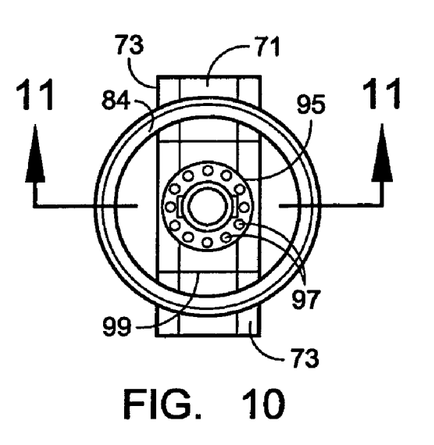
FIG. 10 is a plan view of the base of FIG. 9.

The interior construction of the base is perhaps best understood from FIGS. 9, 10 and 11. The feedstock port, which is defined by the lowermost tubes 75, serves to flood the entire interior of the base, providing a small reservoir 89 of feedstock. The intermediate level tubes 73, as seen in FIG. 8, form a part of a composite conduit 91 that serves as the permeate manifold and runs diametrically through the bases. A short coupling 93 extends upward from the permeate manifold or header 91 at its midpoint in each base; it connects the permeate tube 85 of each cartridge 63 to the permeate header conduit 91. The coupling 93 is of such a diameter that it is accommodated within a diffuser 95, and sealing is via suitable O-rings or other gaskets.

The annular diffuser 95, which surrounds the coupling 93, contains a ring of spaced apart, upwardly open apertures 97 through which air may be bubbled into the liquid feedstock that fills the reservoir 89 when air scouring is desired. Short linking conduits 99 interconnect the tubes 71 in walls of the bases with opposite surfaces of each diffuser 95 to complete the compressed air manifold. Although it has been surprisingly found that, in many cases, air scouring is not needed at all due to beneficial effects of operating in accordance with the method detailed hereinafter, all liquid feedstock is drained after every backwash, such may be optionally used when desired for particular feedstocks.

Generally, the filtration systems of the invention are kept clean using a combination of back-washing, feedstock removal (i.e. draining), and periodic cleanings. In some cases, air is used on a continuous or periodic basis to provide additional cleaning methods. In addition to using these systems to treat a variety of wastewaters, such as effluents from secondary or tertiary sewage treatment, they may also be used for surface water treatment to provide drinking water. They may also be employed as a part of a membrane bioreactor.

When the system 61 is in operation, aqueous feedstock containing suspended solids will usually be fed through the lowermost tube 75 into the base 69 at one end of the aligned plurality of vertically oriented filtration cartridges 63. Although ten cartridges are illustrated, it should be understood that any number of interconnected cartridges might be employed as desired to handle a particular filtration load. Although a straight-line alignment is preferred and facilitates manufacturing and assembly, such a series of filtration devices might be arranged to have other alignments. The interconnection of all of the bases 69 via the couplings 81 creates the manifold arrangement 65 for supplying feedstock to all the cartridges. The couplings 77 and 79 likewise create other headers. Feedstock may be supplied to the base at either or both ends of the row and serves to flood the reservoirs 89 of all of the interconnected bases 69. Supply of feedstock under suitable pressure, as by pumping, gravity head or the like is regulated so as to cause the liquid feedstock to flow upward through the axially extending spiral feed passageways throughout each membrane cartridge 63, that are provided by the presence of the highly porous feed spacer sheets 23, at the desired rate of flow for that operation.

A source of air or other gas from a blower or compressor or other source is connected to the uppermost short tube 71 at at least one end of the line of cartridges and fills the manifold provided by interconnection by the short couplings 77. Thus, when optional air-scouring is desired, the supply of air under desired pressure to the diffuser 95 in each base causes bubbles to be created by flow through the holes 97 in the upper wall of the diffuser, see FIGS. 10 and 11. These bubbles would travel upward through the feed spacer passageways in this filtration cartridge, lifting liquid and scouring solids from the active membrane surface as explained hereinbefore. The air may be allowed to return to the atmosphere through the open upper end of the cartridge and the open cap 67, or if desired, closed caps could be used to recycle air or other gas. Although the system has been thus far described with regard to treatment of wastewater type feedstocks, it should also be understood that it is expected to have value in the separation of liquid from solids as a part of other industrial processes; for example, it may be employed in beer or wine making. For instance, treatment of the bottoms from beer brewing vats might be employed to salvage brew that would otherwise be discarded, or for the clarification of wine prior to bottling. Moreover, there are pharmaceutical applications, particularly fermentation processes, that can beneficially employ these systems to separate solids. In particular of the above-mentioned industrial processes, it may be desirable to use other gases for scouring or the like, such as nitrogen and $CO_2$, i.e. gases that would not be detrimental to taste. An overall construction of upper manifolds created by interconnected caps 67 that have closed tops, instead of the open top illustrated in FIG. 7, would permit capture and recycle of an inert or other gas that was being employed for this purpose.

The pressure differential between the liquid feedstock in the feed spacer passageways and the regions of the permeate sheets can be created in any suitable manner as discussed hereinbefore; however, vacuum is preferably used. For example, a vacuum pump, centrifugal pump, or the like can be connected to the permeate header at one or both ends of the aligned plurality of interconnected bases 69. The upper end of each cartridge central permeate tube 85 is closed with a plug 101, and as a result, all of the permeating water that finds its way inward through the spiral wound membranes travels down the interior of the perforated tube 85, and exits through the short coupling 93 within each base to enter the interconnected tubular sections 91 that create the permeate header. Discharge from this header is routed to a permeate collection tank generally as previously described for a submerged system. The supply of feedstock to the bases at the lower end of the filtration cartridges 63 is suitably regulated as desired. Control may be such that there is no overflow, as in a dead-end filtration mode, or some overflow through the caps 67, as in a crossflow filtration mode. In such mode, some feedstock, with a higher concentration of solids, as a result of 90+% of the water having been filtered therefrom, flows through the cap side ports, provided by the stub tubes 83, in an upper manifold arrangement. Discharge from the interconnected caps, at one or both ends of the aligned array of cartridges, may be routed to drain or to a further processing unit.

Figure 12:
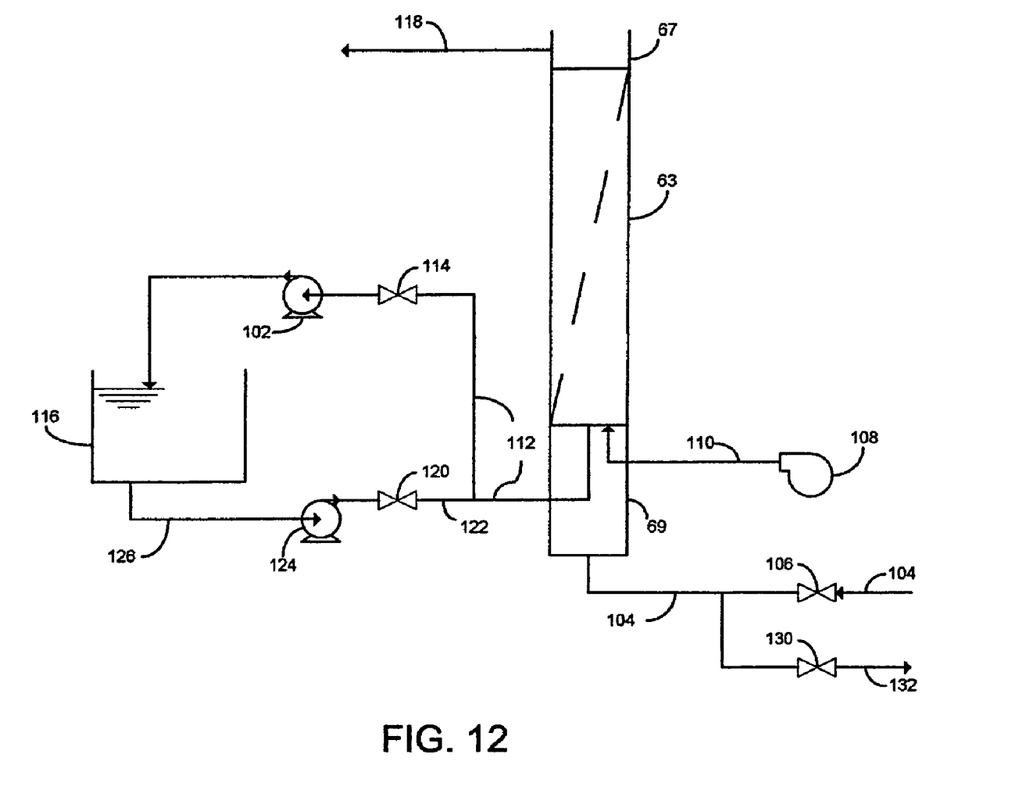
FIG. 12 is a schematic view of an operational system employing the filtration system shown in FIGS. 5-11.

FIG. 12 schematically illustrates what might be a representative arrangement for a tankless membrane cartridge filtration system of the general type just described with respect to FIGS. 5 to 11. A vacuum pump 102 is utilized to draw permeate from the interconnected spiral wound membrane filtration cartridges 63 via the interconnected support bases 69 and provide the desired TMP. Overflow caps 67 atop the cartridges 63 are interconnected as seen in FIG. 6. Feed from a supply line 104 which contains a valve 106 enters the support base through the tube 75. Air is delivered to the support base arrangement by a blower 108 through a line 110 and fills the manifolded interior regions of the diffusers; bubbles created by the diffusers enter the open bottom end of the membrane cartridges 63. Permeate being withdrawn from the membrane cartridges 63 flows through a line 112, which connects to the permeate manifold and contains a valve 114; it is pumped into a permeate collection tank 116 by the vacuum pump 102. Liquid exiting the upper ends of the cartridges flows into the interconnected overflow caps 67 and exits through line 118 leading to drain or partial recirculation as desired. Periodically, permeate production is halted, and the system is backwashed to remove accumulated suspended solids as earlier described. The flow of feedstock is halted by closing valve 106, permeate removal is halted by stopping pump 102 and closing valve 114, and any air flow is discontinued by stopping blower 108. A valve 120 in a line 122 that connects at a tee to the permeate line 112 is opened, and, a pump 124 is started. The pump 124 withdraws permeate water from the permeate collection tank 116 through a line 126 and delivers it to the permeate manifold where it flows as pressurized backwash water to the membrane cartridges 63. During backwashing, the liquid pumped through the membranes flows upward in the feed space channels and out the top of each cartridge 63 into the cap 67 and then to the line 118. Backwashing with permeate is continued for a pre-determined time for which it was shown that a target value cleaning would have been reached, i.e. so that the permeate flow rate will have returned to at least about 90% of its initial flow rate at the initial TMP; then membrane backwashing is halted by stopping pump 124 and closing valve 120. With the pump 124 stopped, a valve 130 in a drain line 132 which connects through a tee to the supply line 104 is opened, and all feedstock and backwash liquid in contact with the active membrane surfaces in the feed spacer channels is removed to drain. Once such drainage from the membrane cartridges 63 and the interconnected bases is complete, valve 130 is closed, valve 106 is opened, and fresh feedstock is supplied to the interconnected membrane cartridges. With the membrane cartridges completely filled with fresh feedstock, the tankless system is returned to permeate production by opening the valve 114 and starting the vacuum pump 102.

Such drainage is preferably effected after every backwashing and is rendered economically feasible by this unique construction. Depending upon the character of the suspended solids in the liquid being treated, however, it may be reasonable to completely drain the cartridges after every other backwashing or at least about every other backwashing, e.g. following combinations of one and two periods of filtration.

The arrangement illustrated in FIGS. 5-11 is not only capable of efficiency of filtration operation comparable to a submerged system, but it provides a more compact arrangement which avoids the need for a large tank or basin. Moreover, it also permits an operational method of filtration wherein the combination of backwashing and subsequent feedstock removal (i.e. draining) is able to maintain performance at a desired high level of filtration for extended periods of time before more extensive chemical cleanings are needed. Moreover, it is found that this is often possible without any air-scouring or perhaps with only minimal air-scouring.

Although the proposed methods render the cartridges surprisingly immune to solids accumulation that is removed by standard backflushing and to buildup of bacteria and the like on the membrane surfaces, in any system exposed to wastewater, it must be expected that some periodic cleaning will be required. In the present instance, it has been found that the use of periodic mini-cleanings performed on a regular basis, for example, daily, or every few days or perhaps only once a week, will adequately clean the spiral wound cartridges; thus, the downtime that is required will be very substantially less than that required by the more typical cleaning cycle in the United States today for wastewater applications. Such mini-cleanings may be carried out by adding cleaning chemicals to permeate being used to back flush the cartridge. These chemicals may employ acids such as citric acid, oxidants such as chlorine or hydrogen peroxide, and bases such as sodium hydroxide, along with detergents, surfactants and chelating agents, such as EDTA, STTP and SBDS. Overall, such periodic mini-cleanings satisfactorily return a spiral wound cartridge to its desirable operational efficiency while minimizing the cost of cleaning chemicals and maintenance.

In this improved method, when the system is started, the initial transmembrane pressure (TMP) across the membrane is set to be sufficient to obtain a desired flow rate of permeate; for example, a TMP of about 1 psi, for a membrane cartridge having a total active membrane surface area of about 180 square feet, may produce a permeate flow of about 25 gfd obtained when operating with a feedstock having suspended solids of about 100 ppm. Operation is monitored, and as the rate of permeate production begins to slowly decrease, the TMP is slowly increased through the operation of the vacuum pump 102 or the like to apply a slightly greater vacuum in order to maintain the approximate targeted gfd per membrane cartridge. However, when the monitoring shows that it has been necessary to increase TMP, e.g. about 2 psi, or perhaps 1 psi, over the initial value to continue to obtain the desired permeate production rate, such may be determined to be an indication that solids accumulation on the membrane surfaces has reached an undesirable level. In the FIG. 12 system, permeate production is then halted by discontinuing the application of vacuum, i.e. halting the vacuum pump 102 and closing the valve 114, and the backwashing pump 124 is actuated to withdraw permeate from the accumulation tank 116 and cause it to flow in the opposite direction through the permeate carrier sheets and out through the pores of the membrane surfaces to dislodge accumulated solids therefrom. It has been found that it is more effective if liquid feedstock levels in the vertical feed spacer passageways are maintained during the backflushing and allow the backflushing fluid, which may include a pressurized gas as well as the aqueous permeate, to exit the upper end of each cartridge, flowing into the upper cap 67 and exiting through the upper manifold to the line 118.

After backflushing is carried out for an appropriate period that has been determined will return the cartridges to essentially their initial condition, i.e. where supply of this feedstock with the initial TMP will result in about the target flow of permeate per membrane cartridge, e.g. at least about 90% thereof, backflushing is discontinued, and the entire interconnected membrane cartridge arrangement as depicted in FIG. 5 is drained by opening the valve 130 in the drain line 132. This removes all of the solids dislodged during backflushing and the high solids concentrate that had built up in the feed spacer passageways during the extended filtration operation, along with the backflush fluid, which may occasionally include mini-cleaning chemicals. After draining has been effected, fresh feedstock is supplied to refill the arrangement by opening the supply line valve 106, and filtration is again begun by operating the vacuum pump 102 with feedstock of the character as initially supplied again in contact with the membrane surfaces. This operating method is found to be economically feasible because, whereas it is not reasonable to completely drain a large tank or basin after each backflushing, the construction illustrated in FIGS. 5-11 minimizes the amount of feedstock liquid associated with each membrane cartridge so that the requisite drainage involves only a much smaller volume, rendering the practice economically reasonable.

The supply of feedstock to the system may be controlled in any satisfactory manner as generally known in this art. For example, if the cartridges are to be operated in a dead-end mode, an equalization tank of feedstock liquid may be employed to provide a level of feedstock sufficient to just cover the upper end of each of the vertical cartridges in the array. Then, the level of the liquid in the equalization tank can be monitored and maintained to assure the desired level is present in each of the cartridges. On the other hand, if operation in a crossflow mode is to be used and, for example, it is desired that about 5% of the feedstock inlet volume should be removed from each cartridge as concentrate, then flow rates of feedstock supply and overflow would both be monitored, and the feedstock supply would be regulated by increasing or decreasing flow as needed so that the outflow volume collected from the overhead manifold arrangement was at about the desired percentage.

The improved operation, as indicated, is based upon relatively frequent backwashing when filtration of a feedstock having a relatively high concentration of suspended solids is being carried out using an array of substantially vertically oriented, spiral wound membrane cartridges of the general type hereinbefore described. The targeted production objective is set for a particular spiral wound cartridge array and a particular feedstock. For example, it may be the desired objective to create a permeate flow through each of the cartridges equal to a rate of about 25 to 35 gfd. For a low pressure operation, the desire will be to obtain this target at operation over a fairly narrow range of TMP, for example, from about 0.5 psi to about 10 psi, and often within a range of about 1-5 psi. Thus, for a particular system, it might, for example, be desirable to achieve the targeted gfd production rate at an initial TMP of about 1 or 2 psi. As production continues, the permeate flow rate will begin to slowly decrease because of the accumulation of solids on the membrane surfaces. To offset this gradual decrease in permeate rate, the TMP is gradually proportionately increased, as by increasing the vacuum being employed, to keep the permeate rate at about its target. When such an increase in vacuum pressure, or, if a pump flow supply arrangement is used, an increase in the feedstock supply pressure, has reached a predetermined increment, for example, perhaps by about 2 psi to 3 psi for a low pressure system, production will be momentarily halted and backflushing instigated.

Backflushing fluid may be gaseous or liquid. It is considered simplest to draw permeate from the permeate accumulation tank and pump it through the permeate carrier leaves and then through the pores of the sheet membrane in opposite to normal direction of flow. Backflushing is carried out at a suitable pressure, e.g. 3 to 10 psi, and can usually be completed in about one minute or less. This operation is essentially similar to that described with respect to FIG. I using the pump 12 which draws suction from the permeate tank 10.

Before startup with a particular feedstock, one or more test runs are made to determine the extent of backflushing that should be required to essentially return the membrane cartridges to their initial, substantially clean condition, i.e. wherein supply of feedstock of the initial characteristics results in the target permeate flow rate at the initial TMP. Thereafter, once conditions have been determined for a feedstock having particular suspended solid concentration characteristics, it is feasible to operate the system on a timed basis.

In other words, once it is determined how long a system can operate before the TMP incremental increase is reached, such is set at the time of operation before periodic backwashing. Production will then be suspended, and backwashing is carried out for a time certain, for example, 30 seconds to about one minute. Once the backflushing time has elapsed in the FIG. 12 system, the valve 120 is closed to halt further backflush flow, and the manifolded group of cartridges, as exemplified by FIGS. 5 and 6, is completely drained so as to remove the high solids concentration feedstock that had built up in the space provided by the feed spacer sheet material (referred to as the "hold-up" volume), the liquid in the bases, the backflush liquid and the dislodged solids. In an arrangement where the upper caps 67 are open to the atmosphere, drainage occurs promptly and substantially completely. Then, after closing the drain valve 130, the feedstock supply valve 106 is reopened, and the manifolded group of filtration cartridges is returned to production.

Operation using this method has been found to often require only minimal or no air-scouring, depending on a particular feedstock's suspended solids characteristics, thus adding to the system's overall economic efficiency. Such ability to maintain substantially continuous production rates except for the short periodic periods of backflushing, for several months at a time before the need to shut down for the inevitable chemical cleaning (which will depend, in some part, upon the characteristics of the feedstock) makes this system particularly attractive. Time certain periods can be established, based upon actual operation of an array of cartridges, so that they are inherently keyed to effect a periodic backflushing followed by programmed draining, thus simplifying overall control. Target levels are determined by decrease in permeate production rate and/or the increase in TMP that is required to maintain a substantially steady production rate, and time intervals are then correspondingly set. For example, an incremental increase of 2-4 psi in TMP may be taken as the trigger to instigate backflushing followed by drainage.

Figure 4:
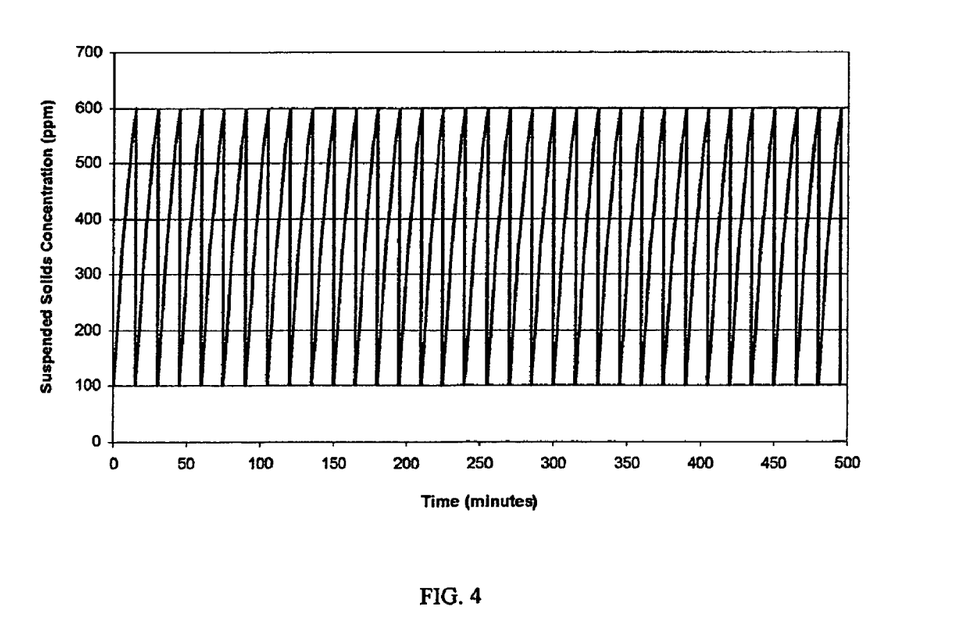
FIG. 4 is a graph of the concentration of suspended solids of the liquid feedstock in contact with the active membrane surface of a cartridge in a system embodying features of the present invention, wherein all feedstock in contact with the active membrane surface is removed after every backwash.

Provided as FIG. 4 is a graph that is comparable to the graph shown in FIG. 3 that was representative of operation of a typical submerged system. For operation with a feedstock having the same initial suspended solids concentration, a system of the type of FIGS. 5-11, as seen in FIG. 4, results in a slow, steady buildup to a particular solids concentration. This level, as can be seen, is substantially lower than the steady state concentration seen in FIG. 3 where operation is continuous for a much longer period of time. Moreover, the level drops back to the initial starting point following total drainage of the system. More specifically, the level at time zero represents the solids concentration of the incoming feedstock, and during operation, the solids level increases over time due to water loss through permeation for this system which is representative of operation in a dead-end mode. After every backwash, all feedstock in contact with the active membrane surface is removed and is replenished with fresh feedstock. Drainage thus lowers the solids level back to that of the incoming feedstock after every backwash. As a result, there is a substantial lowering of the overall average level of suspended solids in the feedstock in the feed spacers in contact with the active membrane surface over total time of operation during an extended period, and such greatly extends the time duration of operation between shutdowns for the inevitable extensive chemical cleaning.

EXAMPLE 1

A polyethersulfone ultrafiltration membrane cartridge, which is sold under the trademark SpiraSep 900 by TriSep Corporation of Goleta, Calif., having a clean water flux rate of about 30 gallons per square foot per day per psi (gfd/psi), having a diamond shaped feed spacer thickness of about 115 mil (3 mm) and a total active membrane surface area of 178 ft$^2$ is employed as the cartridge depicted in FIGS. 5 and 12. It is operated on a wastewater feedstock from a municipal wastewater plant wherein the feedstock carries 100 ppm of suspended solids. The membrane cartridge 63 is attached to a base and has an upper cap 67 to collect overflow during backwashing. The membrane cartridge is operated in a dead-end mode during the filtration cycle, so that no feedstock is overflowing during the filtration cycle; thus, during the filtration cycle, the feedstock feed rate is equal to the permeate flow rate. The membrane cartridge 63 is initially operated at a TMP of about 2.0 psi supplied by a vacuum pump 102 and produces a permeate flux rate of 30 gfd. It is backwashed every 20 minutes for a length of 30 seconds, and overflow through the cap 67 occurs during the backwash. After every backwash, all feedstock in contact with the active membrane surface is removed by draining the manifolded group, as shown in FIG. 12 by opening a drain valve 130 in the line 132 which could contain an optional drain pump. It was surprisingly found that removal of all liquid feedstock in contact with the active membrane surface in the feed spacers after each and every backwash, which liquid carries with it the dislodged accumulated solids from said membrane surface, is so successful in keeping the membranes clean, that the need to bubble air for the sake of scouring the membrane to maintain steady permeate production is not needed for many feedstocks. When there is no need for air bubbling, there are significant cost savings with respect to both capital and operating expenditures.

Treatment of a feedstock containing 100 ppm of suspended solids operated by draining the feedstock after every backwash can result in an average feedstock in contact with the active membrane surface containing less than about 600 ppm. In comparison, if this same membrane cartridge were to be operated in a traditional submerged design, as depicted in FIG. 1, the average suspended solids level in contact with the membrane surface would be about 1000 ppm, assuming both cartridges achieved about 90% recovery.

EXAMPLE 2

Another spirally wound membrane cartridge is constructed having with the same physical description given in Example 1, except a corrugated spacer with a thickness of about 80 mil (2 mm) and peak to peak distance of about 4.3 mm is used; the resulting active membrane surface area is about 220 ft$^2$. The membrane cartridge is installed and operated on wastewater from a cheese plant with feed characteristics of about 1,000 ppm total suspended solids (TSS).

A vacuum is generated, by means of a centrifugal pump, to maintain a TMP of about 2 psi, and air is continuously delivered to a gaseous diffuser below the open bottom end of the cartridge at a rate of 6.2 scfm. The membrane cartridge is operated in a dead-end mode during the filtration cycle so that only air flows out the cap, except during backwashing. Backwashing using permeate at a pressure of about 4.0 psi is repeated every 5 minutes for a period of 30 seconds. After every backwash, a drain valve is opened, and the feedstock remaining inside the cartridge is drained.

It is found that the air bubbling process and the total removal of liquid feedstock from the system after every backwash is so successful at maintaining a clean membrane surface that the system has to be chemically cleaned only once per month. In comparison, a similar membrane cartridge producing a comparable flow rate of permeate in a standard submerged operation of the general type as shown in FIG. 1 on the same feedstock would require chemical cleaning about every 7 days.

EXAMPLE 3

Two spirally wound membrane cartridges are configured with the same physical construction described in Example 1 but with a PVDF membrane chemistry, and they are operated on effluent from a municipal wastewater activated sludge process. They are connected in series flow in a vertical orientation to create a pair of stacked cartridges where the feedstock being supplied flows upward through the feed spacers in the lower cartridge and then through those in the upper one. They are operated in dead-end mode. This stacked configuration reduces overall footprint by 50%.

Effluent from the activated sludge process typically has a turbidity about 80-100 NTU. The stacked arrangement is operated at a permeate flux rate of about 30 gfd, and air is periodically bubbled into the feedstock in the base at a rate of 3.1 scfm for a total of only 3 minutes out of every 10 minutes. The system is backwashed every 20 minutes for 40 seconds, and after every backwash, the liquid feedstock is drained from the cartridge. The stacked arrangement only requires chemical cleaning every 3 months, whereas a comparable submerged cartridge system operating in dead-end mode would need such a chemical cleaning every 8 weeks.

The stacked membrane cartridges are cleaned by pumping a 1000 ppm chlorine solution at a pH of 11.0 into the open bottom end of the first cartridge, and removing the cleaning solution from the open top end of the second cartridge. The method of pumping the cleaning solution through the stack from bottom and out the top creates a dynamic cleaning scenario (i.e. cross flow) that increases the overall cleaning effectiveness compared to static soaking. Moreover, this configuration allows the volume of cleaner to be reduced by restricting the cleaner to within the cartridges and bases rather than having it contaminate a large basin, while elimination of any need for accompanying air scouring during cross-flow cleaning avoids any potential need to take precautions with respect to harmful vapors, as when using air bubbling in a soaking environment.

EXAMPLE 4

Another spirally wound membrane cartridge is constructed having the same physical description given in Example 1. The membrane cartridge is installed and operated on wastewater from a cheese plant with feed characteristics of 1,000 ppm total suspended solids (TSS).

A vacuum is generated, by means of a centrifugal pump, to maintain a TMP of about 2 psi, and air is delivered to the gaseous bubble diffuser at a rate of 6.2 scfm. The membrane cartridge is operated in a crossflow mode with continuous removal of concentrated feedstock by overflowing 5% of the feedstock supplied out the upper end cap. Backwashing with permeate at a pressure of about 6.0 psi is repeated every 5 minutes for a period of 30 seconds. After every backwash, a drain valve is opened, and the remaining feedstock inside the cartridge is drained.

For periodic chemical cleanings, cleaning solution is pumped at low velocity through the bottom base, up through the membrane cartridge, and out the top of the upper cap. This convective flow of the cleaning solution effectively removes any accumulated materials and bacteria that have built-up within on the filter cartridge. As a result, the interval between chemical cleanings, compared to operation in a submerged mode, increases by at least 25%.

Although the invention has been described with regard to certain preferred embodiments which constitute the best modes presently known to the inventors for carrying out the invention, it should be understood that various changes and modifications as would be obvious to one having ordinary skill in the art may be made without departing from the scope of the invention which is set forth in the claims appended hereto. For example, multiple elements may be stacked on top of another and be in fluid connection with one another for the purpose of reducing system footprint. Although it is suggested that feedstock solution should be drained after every backwash, such might be done after every other backwash or in a comparable programmed arrangement. Although air bubbles are commonly used to combat membrane fouling, because the supply of air requires a significant expenditure of energy, operation without air bubbling is clearly advantageous from an economics standpoint. Although some air bubbling, continuous or periodic, may be needed for exceptionally turbid feedstocks, reduction in energy consumption in many such situations may be achieved by employing periodic bubbling, wherein interspersed periods of non-bubbling of about 2 minutes or more, and preferably between about 3 minutes and about 5 minutes are used. By operating using such on/off bubbling, with the bubbling on only about 75% of the time, or even on for as little as only 25% to 50% of the time, can, under many conditions, provide stabilized permeate flux in the range desired with such feedstocks. Although a perforated permeate tube is shown and mentioned, such should be understood to mean any suitable porous sidewall tube. Although many of the tests mentioned hereinbefore utilize only a single vertical aligned cartridge, it should be understood that, in many commercial operations, a multitude of such cartridges would usually be employed. Although a specific vertical alignment of the feed, drain, and gas ports is shown in a base, these could also be done in horizontal, offset, or co-axial arrangements. Although it is suggested that the spirally wound lay-up maybe retained in the generally cylindrical form of a cartridge by an outer casing, it should be understood that other means of wrapping or the use of thin wall tubes could alternatively be employed to retain this desired cylindrical shape. Although it may be more desirable to have liquid feedstock enter the bottom of the cartridge as illustrated, feedstock may alternatively be supplied to the top of the cartridge. Also, permeate could be withdrawn from the top of the cartridge as well as the bottom of the cartridge. While the incorporation of a top cap is desirable, such is not always required, and other arrangements could be made for withdrawing a concentrate stream or a stream of backwash fluid. Although the frequency and duration of the backwash or mini-cleanings is given as for certain time ranges, the actual intervals and durations may vary depending on the particular application.

The disclosures of all previously mentioned patents and patent applications are expressly incorporated herein by reference. Particular features of the invention are emphasized in the claims which follow.

The invention claimed:

1. A system for the filtration of a liquid feedstock high in suspended solids for the purpose of economically producing permeate lean in suspended solids, which system comprises:
   a) a plurality of spiral wound membrane filtration cartridges which each includes membrane filter sheet material, feed spacer sheet material and permeate carrier sheet material spirally wound about a perforated permeate collection tube and confined within an open-ended tubular casing in a generally cylindrical, liquid-tight configuration, which casing is not submerged in liquid in a tank but has its exterior surface in contact with the atmosphere,
   b) an interconnected group of bases each of which supports one said cartridge in a substantially vertical orientation,
   c) said interconnected group of bases being connected to a supply of a liquid feedstock,
   d) a seal between each said base and each said cartridge so that liquid feedstock being supplied flows upward in said cartridge through said feed spacer material,
   e) means for creating a vacuum within each said permeate collection tube to cause liquid lean in suspended solids to permeate through said membrane sheet material as a result of transmembrane pressure (TMP) thereacross and for withdrawing permeate from said cartridge, means for controlling the supply of liquid feedstock so that liquid level in said casing is maintained at about a constant height therewithin and said filtration cartridge operates in dead end mode,
   f) a bubbler in each said base for creating an upwardly flowing stream of gas bubbles in the liquid feedstock below said cartridge, which stream will enter said open end at the bottom of said cartridge and exit to the atmosphere at an open upper end of said tubular casing,
   g) a source of pressurized back-flush fluid,
   h) means for periodically initiating reverse flow of such back-flush fluid through the collection tube and the permeate carrier fabric sheet into said feed spacer material to back-flush said cartridge whenever permeate flow from said cartridge is indicative of an undesirable extent of solids accumulation on said overall membrane surface, and
   i) means for withdrawing from said system the liquid in said cartridge feed spacer sheet material of each cartridge which includes said back-flush fluid and solids dislodged by said back-flush fluid and the volume of feedstock in said interconnected supporting bases following completion of said back-flush flow and before resupplying fresh liquid feedstock to said bases and said cartridges.

2. The system of claim 1 wherein said feed spacer sheet material has a thickness of at least about 0.05 inch (about 1.3 mm) and not exceeding about 0.25 inch and has a corrugated pattern of between 2 and 6 corrugations per inch such as to allow an upwardly flowing stream of bubbles to rise in the axially extending spiral passageways provided by said feed spacer sheet material in a manner such that bubbles reach and scour active surfaces of said membrane sheet material flanking said feed spacer sheet material, whereby the provision of a net driving pressure of at least about 0.5 psi (about 26 mm of Hg) across said membrane sheet material causes permeation of water lean in solids and low in turbidity into said permeate carrier sheet material at a flux of at least about 5 gfd per psi of average net driving pressure over an extended period of time.

3. The system of claim 1 wherein said membrane has a permeability to water of at least about 50 gfd/psi and is of a microfiltration or ultrafiltration type made from polysulfone, polyethersulfone, polyvinylidene fluoride or polyacrylonitrile, and wherein feed spacer material is between 0.05" to 0.15" in thickness.

4. The system of claim 1 wherein an open cap is connected to each tubular casing at its top which allows gas bubbles to escape to the atmosphere and wherein a plurality of said caps are mechanically interconnected to collect overflow liquid flow therefrom for return to said supply of liquid feedstock.

5. A system for the filtration of a liquid feedstock high in suspended solids for the purpose of economically producing permeate lean in suspended solids, which system comprises:
   a) a plurality of spiral wound membrane filtration cartridges which each includes membrane filter sheet material, feed spacer sheet material and permeate carrier sheet material spirally wound about a perforated permeate collection tube and confined within an open-ended tubular casing in a generally cylindrical, liquid-tight configuration, which casing is not submerged in liquid in a tank but has its exterior surface in contact with the atmosphere and its top open to the atmosphere,
   b) an interconnected group of bases each of which supports one said cartridge in a substantially vertical orientation,
   c) said interconnected group of bases being connected to a supply of a liquid feedstock,
   d) a seal between each said base and each said cartridge so that liquid feedstock being supplied flows upward in said cartridge through said feed spacer material,
   e) means for controlling the supply of liquid feedstock so that liquid level in said casing is maintained at about a constant height therewithin and said filtration cartridges operate in dead end mode,
   f) means for creating a vacuum in each said permeate collection tube so as to cause liquid to permeate through said membrane sheet material as a result of transmembrane pressure (TMP), and for withdrawing liquid lean in solids from said cartridge,
   g) a bubbler in each said base for creating an upwardly flowing stream of gas bubbles in the liquid feedstock below said cartridge, which stream of bubbles will enter said open end at the bottom of said cartridge and exit to the atmosphere at an open upper end of said tubular casing,
   h) a source of pressurized back-flush fluid,
   i) means for periodically initiating reverse flow of such back-flush fluid through the collection tube and the permeate carrier fabric sheet into said feed spacer material to back-flush said cartridge whenever permeate flow from said cartridge is indicative of an undesirable extent of solids accumulation on said overall membrane surface, and
   j) means for withdrawing from said system following periodic reverse flow the volume of liquid in each said cartridge feed spacer sheet material which includes said back-flush fluid and any solids dislodged by said back-flush fluid and the volume of feedstock in said interconnected supporting bases and following said withdrawal resupplying fresh liquid feedstock to each said base and each said cartridge.

6. The system of claim 5 wherein said feed spacer sheet material has a thickness of at least about 0.05 inch (about 1.3 mm) and not exceeding about 0.25 inch and has a pattern of between 2 and 6 axially oriented corrugations per inch such as to allow an upwardly flowing stream of bubbles to rise in the axially extending passageways provided by said spirally wound feed spacer sheet material in a manner such that bubbles reach and scour active surfaces of said membrane sheet material flanking said feed spacer sheet material, whereby the provision of a net driving pressure of at least about 0.5 psi (about 26 mm of Hg) across said membrane sheet material causes permeation of water lean in solids and low in turbidity into said permeate carrier sheet material at a flux of at least about 5 gfd per psi of average net driving pressure over an extended period of time.

7. The system of claim 4 wherein said membrane has a permeability to water of at least about 50 gfd/psi and is of a microfiltration or ultrafiltration type made from polysulfone, polyethersulfone, polyvinylidene fluoride or polyacrylonitrile, and wherein feed spacer material is between 0.05" to 0.15" in thickness.

8. A system for the filtration of a liquid feedstock high in suspended solids for the purpose of economically producing permeate lean in suspended solids, which system comprises:
   a) a plurality of spiral wound membrane filtration cartridges which each includes membrane filter sheet material, feed spacer sheet material and permeate carrier sheet material spirally wound about a perforated permeate collection tube and confined within an open-ended tubular casing in a generally cylindrical, liquid-tight configuration, which casing is not submerged in liquid in a tank but has its exterior surface in contact with the atmosphere,
   b) an interconnected group of bases each of which supports one said cartridge in a substantially vertical orientation,
   c) said interconnected group of bases being connected to a supply of a liquid feedstock,
   d) a seal between each said base and each said cartridge so that liquid feedstock being supplied flows upward in said cartridge through said feed spacer material,
   e) means for withdrawing liquid which permeates through said membrane sheet material of each said cartridge by applying vacuum to said permeate collection tube through said base to create a net driving transmembrane pressure (TMP) of at least about 0.5 psi (about 26 mm of Hg) across said membrane sheet material to cause, such permeation and means for controlling the supply of liquid feedstock so that liquid level in said casing is maintained at about a constant height therewith in and said filtration cartridge operates in dead end mode
   f) a bubbler in each said base for creating an upwardly flowing stream of gas bubbles in the liquid feedstock below said cartridge, which stream will enter said open end at the bottom of said cartridge and exit to the atmosphere at an open upper end of said tubular casing,
   g) a source of pressurized back-flush fluid,
   h) means for periodically initiating reverse flow of such back-flush fluid through said base, the permeate collection tube and the permeate carrier fabric sheet into said feed spacer material to back-flush said cartridge whenever permeate flow from said cartridge is indicative of an undesirable extent of solids accumulation on said overall membrane surface,
   i) means connected to said interconnected group of bases for withdrawing from said system all of the volume of liquid in each said cartridge feed spacer sheet material, which includes any of said back-flush fluid and solids dislodged by said back-flush fluid, and the volume of feedstock in said supporting base following completion of said back-flush flow, and
   j) means for resupplying fresh liquid feedstock to said base and said cartridge following operation of said withdrawing means whereby permeation of water lean in solids and low in turbidity into said permeate carrier sheet material is achieved at a flux of at least about 5 gfd per psi of average net driving pressure over an extended period of time,.

9. The system of claim 8 wherein said feed spacer sheet material has a thickness of at least about 0.05 inch (about 1.3 mm) and not exceeding about 0.25 inch and has a corrugated pattern of between 2 and 6 corrugations per inch such as to allow an upwardly flowing stream of bubbles to rise in the axially extending spiral passageways provided by said feed spacer sheet material in a manner such that bubbles reach and scour active surfaces of said membrane sheet material flanking said feed spacer sheet material.

10. The system of claim 8 wherein an open cap is connected to each tubular casing at its top which allows gas bubbles to escape to the atmosphere and wherein a plurality of said caps are mechanically interconnected to collect overflow liquid flow therefrom for return to said supply of liquid feedstock.

11. The system of claim 8 wherein said membrane has a permeability to water of at least about 50 gfd/psi and is of a microfiltration or ultrafiltration type made from polysulfone, polyethersulfone, polyvinylidene fluoride or polyacrylonitrile, and wherein feed spacer material is between 0.05" to 0.15" in thickness.

\* \* \* \* \*